United States Patent [19]

Blaylock

[11] Patent Number: 4,617,860
[45] Date of Patent: Oct. 21, 1986

[54] EGG COOKING DEVICE

[76] Inventor: Michael A. Blaylock, Rte. 1, Prim Springs, Tenn. 38476

[21] Appl. No.: 794,719

[22] Filed: Nov. 4, 1985

[51] Int. Cl.⁴ .......................................... A47J 29/06
[52] U.S. Cl. ....................................... 99/415; 99/426; 99/440; 426/523; 426/614
[58] Field of Search ................. 99/403, 440, 426, 410, 99/415, 418; 426/523, 511, 614

[56] References Cited

U.S. PATENT DOCUMENTS

| 211,859 | 2/1879 | Manley | 99/440 X |
| 499,426 | 6/1893 | Hill | 99/440 |
| 1,433,824 | 10/1922 | Jensen | 99/440 |
| 2,226,844 | 12/1940 | Carr | 99/440 X |
| 3,757,674 | 9/1973 | Carroll | 99/440 X |
| 3,791,285 | 2/1974 | Mack | 99/440 X |

FOREIGN PATENT DOCUMENTS 742280  3/1933  France ................................. 99/440

Primary Examiner—Billy J. Wilhite
Attorney, Agent, or Firm—Harrington A. Lackey

[57] ABSTRACT

An egg cooking device, including a lower cup-shaped member with an upward projecting cylindrical skirt member and a cap member having a dome surrounded by a cylindrical guide wall, slideably receivable within the skirt member to a closed position in which the dome and the cup-shaped member have a general egg shape for confining and molding the contents of an egg, without the shell, while the egg is being cooked within the device. The egg cooking device is also provided with a pedestal for supporting the cooking device in an upright position, particularly while it is being cooked, and an air vent is formed in the dome of the cap member to facilitate removal of the cap member from the receptacle after the egg has been cooked.

6 Claims, 4 Drawing Figures

EGG COOKING DEVICE

BACKGROUND OF THE INVENTION

This invention relates to an egg cooking device, and more particularly to a device for cooking the contents of the egg without the shell.

Egg cooking devices, for cooking individual eggs, such as in boiling water, are well known in the art as illustrated in the following patents:

| U.S. Pat. No. | | |
|---|---|---|
| 211,859 | Manley | Feb. 4, 1879 |
| 499,426 | Hill | Jun. 13, 1893 |
| 1,433,824 | Jensen | Oct. 31, 1922 |
| 3,757,674 | Carroll | Sep. 11, 1973 |
| 3,791,285 | Mack | Feb. 12, 1974 |
| Foreign Patents (France) | | |
| 742,280 | Gaury | Mar. 3, 1933 |

The Jensen U.S. Pat. No. 1,433,824 discloses devices for cooking eggs within their shells.

The Mack U.S. Pat. No. 3,791,285 discloses a device for cooking and molding egg whites surrounding a food ingredient other than the egg yolk.

The Manley, Hill and Carroll patents disclose individual cooking devices for eggs without their shells, including cup-shaped members for receiving the contents of the egg and a cap member for closing the upper portion of the cup-shaped member.

However, none of the above patents disclose a receptacle having a lower cup-shaped portion and an upper sleeve or skirt portion adapted to receive a cap member having a dome, which not only closes the upper portion of the receptacle, but also descends far enough into the receptacle to assist in shaping the egg contents as they are being cooked.

SUMMARY OF THE INVENTION

One object of this invention is to provide an egg cooking device in which the contents of an egg, after the shell has been removed, may be entirely received within the receptacle of the device and the cap member of the device may be inserted into the open upper end of the receptacle to substantially mold the egg contents during the cooking process, into the shape of the original egg.

More specifically, the egg cooking device made in accordance with this device includes a receptacle and a cap member in which the receptacle has a lower semi-egg shaped portion and an upper cylindrical skirt member or wall, and the cap member includes a dome having the general shape of the upper portion of the egg surrounded by a cylindrical guide wall adapted to telescope within the skirt wall until the opposing cup-shaped member and the dome are in a closed position, forming a cavity for receiving and molding substantially the entire egg contents.

A pedestal is formed upon the bottom of the receptacle to permit the device to be supported in an upright position, particularly when it is immersed in a container of boiling water for cooking. Furthermore, the dome is preferably provided with an air vent to eliminate a vacuum within the egg cavity, when the cap member is removed. The air vent also minimizes internal pressures within the egg cavity when the egg is cooking.

Another advantage of the upper skirt portion is to permit the device to be substantially immersed in the boiling water for cooking the egg contents without water leaking into the egg cavity, or the contents of the egg cavity leaking into the water.

DESCRIPTION OF THE PREFERRED EMBODIMENT

Figure 1:
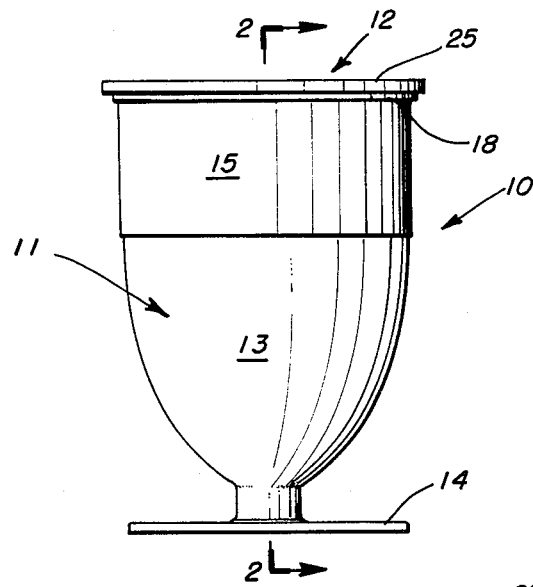
FIG. 1 is a side elevational view of the egg cooking device, made in accordance with this invention, with the cap member in a closed position.

Referring now to the drawings in more detail, the egg cooking device 10, made in accordance with this invention, preferably includes two cooperating pieces or elements, namely a receptacle 11 and a cap member 12.

The receptacle 11 includes a lower cup-shaped member 13 in a shape, such as a paraboloid, or the long pointed end portion of an egg. The bottom of the cup-shaped member 13 is mounted upon a pedestal 14, which may be an integral part of the cup-shaped member 13, if desired. The pedestal 14 may be of any desired construction that will support the receptacle 11 in a substantially vertical upright position.

Figure 2:
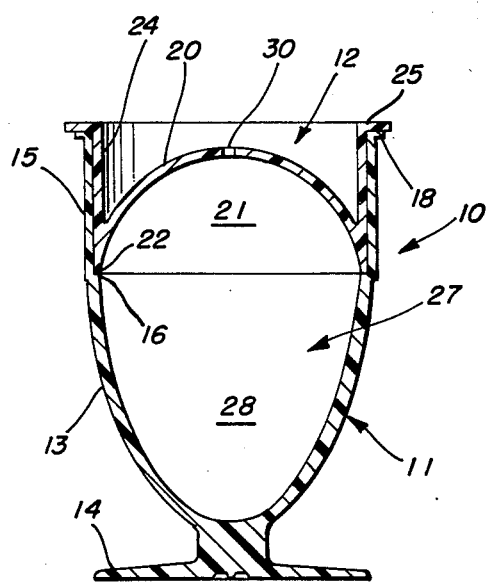
FIG. 2 is a section taken along the line 2—2 of FIG. 1.

In a preferred form of the invention, the upper end portion of the cup-shaped member 13 merges with the lower end portion of an upper cylindrical skirt member or wall 15. As disclosed in FIGS. 2 and 3, the cylindrical skirt member 15 is slightly radially offset outwardly, relative to the upper end portion of the cup-shaped member 13 to form an annular recess 16. The annular recess 16 is in the form of a circular or annular ledge which faces upward.

The upper end portion of the skirt member 15 terminates in a top annular rim 17, which may have a radially, outwardly extending flange or lip 18.

The cap member 12 includes a dome 20 having a downwardly facing concave interior surface 21, which terminates in a bottom annular rim 22. The interior surface 21 of the dome 20 is designed to be generally in the shape of the short or blunt end portion of the egg.

Surrounding the dome 20 is a cylindrical guide wall 24 whose lower portion merges in the bottom rim 22. Preferably, the guide wall 24 is formed integrally with the dome 20 and projects above the dome 20. The upper end portion of the guide wall 24 terminates in a radially outward directed stop flange 25.

In a preferred form of the invention, the outer diameter of the cylindrical guide wall 24 is only slightly less than the inner diameter of the skirt wall 15, so that the guide wall 24 and skirt wall 15 may slideably interfit in a telescoping manner. The relative heights of the guide wall 24 and the skirt wall 15 are such that when the bottom rim 22 engages the ledge 16, the stop flange 25 would engage the top rim 17 of the receptacle 11. Thus, both the annular ledge 16 and the stop flange 25 provide alternate or cooperative means for stopping the downward movement of the cap member 12 relative to the receptacle 11 in a closed position in which the interior surface 21 of the cap member 20 forms an interior cavity 27 with the interior surface 28 of the cup-shaped member 13, generally in the shape of an egg.

In a preferred form of the invention, the radial dimension of the annular ledge 16 and the thickness of the bottom rim 22 are such that the interior surfaces 21 and 28 are flush at their juncture point to provide a continuous and smooth interior surface for the entire egg cavity 27.

The top of the dome 20 is preferably provided with an air vent or port 30 to relieve the pressure within the egg cavity 27 and also to reduce the vacuum within the cavity 27 when the cap member 12 is being removed from the receptacle 11.

In the operation of the cooking device 10, the cap member 12 is removed from the receptacle 11. The interior surfaces 21 and 28 are sprayed, or otherwise coated, with any type of conventional non-stick compound. The egg to be cooked is selected, the shell broken and the contents 32 of the egg deposited into the receptacle 11. As disclosed in FIG. 3, the liquid contents of the raw egg 32 may fill the receptacle 11 to an elevation, such as the elevation 33 disclosed in dashed lines in FIG. 3.

Figure 3:
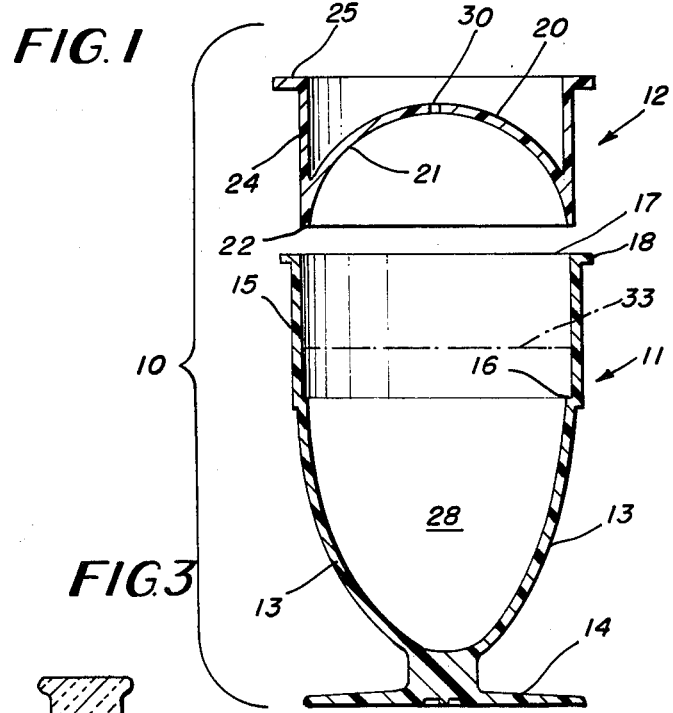
FIG. 3 is an exploded view of the device disclosed in FIG. 2, with the cap mexber in an open position.

The cap member 20 is then placed in a position above the receptacle 11, such as that disclosed in FIG. 3, and thrust downward, causing the cylindrical guide wall 24 to fit within and slide downwardly along the interior surface of the skirt wall 15. The downward movement of the cap member 12 is continued until the bottom rim 22 engages the ledge 16 and/or the stop flange 25 engages the top rim 17 of the receptacle 11, in a closed position. In the closed position, the egg cavity 27 formed by the interior surface 21 of the dome 20 and the interior surface 28 of the cup-shaped member 13 is substantially filled with the egg contents 32, as best disclosed in FIG. 4. If the volume of the egg contents is greater than the volume of the cavity 27, the excess raw egg may spill through the air vent 30, and subsequently removed before cooking.

The closed cooking device 10, including the egg contents 32, is then lowered in an upright position into a larger container 35 having a bath 35 of boiling water. Preferably the level of the water bath 35 is about the same as the height of the annular ledge 16. The cooking device 10 is maintained in its upright position within the water bath 34 by the pedestal 14. The lid 38 is then placed over the container 34 and the egg contents 32 cooked within the boiling water bath 35 for the desired length of time for preparing a soft-boiled or hard-boiled egg. The cooking container 34 is then removed from the source of heat and the cooking device 10 permitted to cool within the water bath 35. The cooking device 10 is then removed from the container 34 and the cap member 12 lifted to expose the boiled egg within the receptacle 11. The egg is then removed for eating without the necessity of peeling a shell from the egg contents 32.

Figure 4:
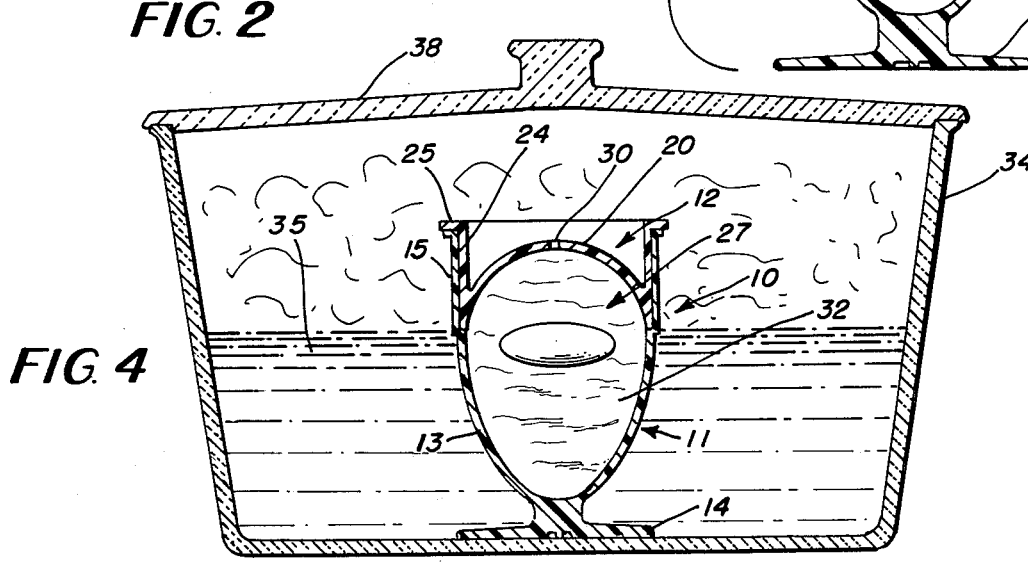
FIG. 4 is a sectional elevational view of the device disclosed in FIG. 2, immersed in boiling water in a cooking vessel.

In FIG. 4, it will be observed that the skirt wall 15 projects a substantial distance above the level of the water bath 35. Since the receptacle 11, including the cup-shaped member 13 and the skirt wall 15 is an integral piece, preferably molded of plastic, the egg contents 32 within the cavity 27 are sealed from leakage of the boiling water into the receptacle 11.

Each of the parts, that is the receptacle 11 and the cap member 12, are preferably formed as unitary pieces from materials which can withstand high temperatures, at least equal to the boiling temperature of water, without deterioration or deformation. In a preferred form of the invention, the receptacle 11 and the cap member 12 are molded from polycarbonate resin, specifically M40F.

Accordingly, an egg cooking device 10 has been developed which will not only successfully cook an egg without its shell, but will also cook the egg with a minimum of leakage and spillage and will also mold the liquid contents of the raw egg, so that when the egg is cooked, particularly hard-boiled, it has the shape of an egg.

Another advantage of the cooking device 10 is that additional food ingredients may be introduced into the receptacle 11, along with the raw egg contents 32 before it is boiled. Such food ingredients may be bacon bits, cheese, spices or other food ingredients which will enhance the taste of the egg.

What is claimed is:

1. An egg cooking device comprising:
   (a) a receptacle for receiving an egg without its shell comprising a lower cup-shaped member generally having the shape of half of an egg and an upper cylindrical skirt member having an open top,
   (b) a cap member comprising a dome and a cylindrical guide wall surrounding the dome,
   (c) said guide wall being slideably receivable coaxially within said skirt member in a closed position in which said dome opposes said cup-shaped member,
   (d) a pedestal on said receptacle for supporting said receptacle in an upright position, and
   (e) an air vent through said dome.

2. The invention according to claim 1 further comprising cooperative stop means between said skirt member and said guide wall to limit the downward movement of said cup-shaped member to said closed position within said receptacle.

3. The invention according to claim 2 in which said skirt member has an annular top rim surrounding said open top, said stop means comprising a flange projecting radially outward from the top of said guide wall for engaging said top rim in said closed position.

4. The invention according to claim 2 in which said stop means comprises an annular upward-facing recess formed on the interior surface of said skirt member, said guide wall having a bottom rim adapted to engage said recess in said closed position.

5. The invention according to claim 4 in which said cup-shaped member merges into said cylindrical skirt member, said recess being formed at the juncture between said cup-shaped member and said skirt member, said dome having an annular bottom edge merging with the bottom rim of said guide wall, whereby when said cap member is in said closed position within said receptacle, the interior surfaces of said cup-shaped member and said mating dome have a general egg shape.

6. The invention according to claim 1 in which said skirt wall projects above said dome in said closed position.

* * * * *